(12) United States Patent
Freiman et al.

(10) Patent No.: US 10,079,906 B2
(45) Date of Patent: Sep. 18, 2018

(54) DEVICE MODE SETTINGS TO PROVIDE AN ENHANCED USER EXPERIENCE

(71) Applicant: Comcast Cable Communications, LLC, Philadelphia, PA (US)

(72) Inventors: Daniel Freiman, King of Prussia, PA (US); Maurice Gaston, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 685 days.

(21) Appl. No.: 14/332,837

(22) Filed: Jul. 16, 2014

(65) Prior Publication Data

US 2016/0021208 A1 Jan. 21, 2016

(51) Int. Cl.
*H04L 29/08* (2006.01)
*G06F 1/32* (2006.01)
*H04W 52/02* (2009.01)
*H04M 1/00* (2006.01)
*H04W 4/18* (2009.01)
*H04M 1/725* (2006.01)

(52) U.S. Cl.
CPC ........ *H04L 67/2823* (2013.01); *G06F 1/3206* (2013.01); *G06F 1/3212* (2013.01); *G06F 1/3234* (2013.01); *G06F 1/3265* (2013.01); *H04L 67/02* (2013.01); *H04L 67/2895* (2013.01); *H04L 67/303* (2013.01); *H04L 67/306* (2013.01); *H04M 1/00* (2013.01); *H04W 52/0254* (2013.01); *H04W 52/0258* (2013.01); *H04M 1/72561* (2013.01); *H04W 4/18* (2013.01); *Y02D 10/153* (2018.01); *Y02D 10/174* (2018.01); *Y02D 70/00* (2018.01); *Y02D 70/142* (2018.01); *Y02D 70/144* (2018.01); *Y02D 70/146* (2018.01); *Y02D 70/164* (2018.01); *Y02D 70/23* (2018.01)

(58) Field of Classification Search
None
See application file for complete search history.

(56) References Cited

U.S. PATENT DOCUMENTS

| 2004/0083291 | A1* | 4/2004 | Pessi | H04L 65/605 709/227 |
| 2004/0181550 | A1* | 9/2004 | Warsta | H04L 51/066 |
| 2008/0189360 | A1* | 8/2008 | Kiley | H04L 67/306 709/203 |

(Continued)

OTHER PUBLICATIONS

HTTP for Servers, www.and.org/texts/server-http, retrieved Oct. 26, 2013, pp. 1-7.

(Continued)

*Primary Examiner* — Patrice L Winder
(74) *Attorney, Agent, or Firm* — Banner & Witcoff, Ltd.

(57) ABSTRACT

According to some aspects of the disclosure, when a computing device sends a request for content, such as an Internet page, the computing device can include with the request one or more device context parameters, such as the computing device's power preferences (e.g., current battery level), wireless settings, network connection, etc. The content provider may then use this device context information to select the most appropriate version of the requested content. One example of device context information may be a low-power power save mode setting, or other mode setting.

20 Claims, 7 Drawing Sheets

(56) References Cited

U.S. PATENT DOCUMENTS

| | | | | |
|---|---|---|---|---|
| 2009/0327775 | A1* | 12/2009 | Hamilton, II | G06F 1/3203 713/320 |
| 2011/0205259 | A1* | 8/2011 | Hagood, IV | G09G 3/2003 345/690 |
| 2011/0246937 | A1* | 10/2011 | Roberts | G11B 27/034 715/810 |
| 2012/0047379 | A1* | 2/2012 | Chen | G06F 1/3212 713/320 |
| 2012/0131145 | A1* | 5/2012 | Garg | H04W 4/18 709/219 |
| 2012/0222092 | A1* | 8/2012 | Rabii | H04N 21/41407 726/4 |
| 2013/0007192 | A1* | 1/2013 | Schmidt | H04L 67/025 709/217 |
| 2013/0046967 | A1* | 2/2013 | Fullerton | H03K 3/0315 713/100 |
| 2013/0301430 | A1* | 11/2013 | Pamu | H04L 69/04 370/252 |
| 2014/0010282 | A1* | 1/2014 | He | H04N 21/23439 375/240.02 |
| 2015/0006667 | A1* | 1/2015 | Foerster | H03M 7/30 709/217 |
| 2015/0019953 | A1* | 1/2015 | Freiman | G06F 17/2247 715/234 |
| 2015/0089262 | A1* | 3/2015 | Cairns | G06F 1/3203 713/323 |
| 2015/0156280 | A1* | 6/2015 | Vaswani | H04L 67/42 709/203 |
| 2015/0271785 | A1* | 9/2015 | Rout | H04W 72/02 455/405 |

OTHER PUBLICATIONS

HTTP Headers for Dummies, Burak Guzel on Dec. 2, 2009, net.tutsplus.com/tutorials/other/http-headers-for-dummies/, retrieved Oct. 27, 2013, pp. 1-24.

HTTP Request Header Editor, lab.laobubu.net/chromeheaderedit/#, retrieved Oct. 27, 2013, laobubu © 2012, pp. 1-5.

List of HTTP Header Fields, en.wikipedia.org/wiki/List_of_HTTP_header_fields, retrieved Oct. 26, 2013, pp. 1-6.

Modify Headers: Add-ons for Firefox by Gareth Hunt, https://addons.mozilla.org/en-US/firefox/addon/modify-headers/, retrieved Oct. 27, 2013, pp. 1-3.

Setting HTTP Request Headers, https://developer.mozilla.org/en-US/docs/Setting_HTTP_request_headers, retrieved Oct. 27, 2013, pp. 1-5.

html—Can I change the headers of the HTTP request send by the browers?—Stack Overflow, stackoverflow.com/questions/374885/can-i-change-the-headers-of-the-http-request-send-by-the-browser, retrieved Oct. 27, 2013, pp. 1-3.

Custom HTTP headers : naming conventions—Stack Overflow, stackoverflow.com/questions/3561381/custom-http-headers-naming-conventions, reteieved Oct. 27, 2013, pp. 1-4.

MIME (Multipurpose Internet Mail Extensions) Part Three: Message Header Extensions for Non-ASCII Text, K. Moore University of Tennessee, Nov. 1996, www.ietf.org/rfc2047.txt, Retrieved Oct. 27, 2013, pp. 1-15.

Request Headers in the HTTP protocol, www.w3.org/Protocols/HTTP/HTRQ_Headers.html, retrieved, Oct. 27, 2013, pp. 1-5.

* cited by examiner

DEVICE MODE SETTINGS TO PROVIDE AN ENHANCED USER EXPERIENCE

BACKGROUND

Many pages on the Internet today are a one-size-fits-all variety. Since users can access the Internet from a wide variety of devices, such as mobile devices with smaller screens and laptops with larger screens, a page on the Internet might not be suitable for certain devices. There will always be a need to improve the user experiences when accessing such pages and other content from a variety of devices.

In addition, devices, such as smartphones, may allow for the installation and execution of third-party applications, but applications may not always make use of all of the features available on the device. There will always be a need for improved integration between devices and applications, as well as associated servers and the devices. These and other shortcomings are addressed by various aspects described below.

SUMMARY

As described herein, some aspects relate to methods and systems that can provide device context information to a content provider when the device, or an associated device, requests content. When a device sends a request for content, such as a network page (e.g., an Internet page), the device can include with the request one or more device context parameters, such as the device's current battery level, wireless settings, network connection, etc. The content creator or provider may then use some or all of the device context information to select the most appropriate version of the requested content.

For example, an aspect involves inserting (e.g., combining) an indication or a selection of a mode setting in a request for content. The mode setting may cause a computing device to select between a plurality of versions of the requested content (e.g., versions of the same web page), and send the selected version of the content to a device. In an aspect, selected content may be sent to an application on the requesting device (e.g., a client computing device). The mode setting may be, for example, related to a power setting, and the content may be configured such that displaying the selected version of the requested content consumes less power (or other resource) than displaying other versions of the requested content.

Additional aspects of the disclosure relate to selecting an appropriate mode setting based on one or more inputs, such as to real-time processor load metrics, memory usage metrics, network usage metrics, display screen brightness, and/or other metrics. In some examples the selection may be manual, but in others it may be fully or partially automated through the use of logic/rules comprising an algorithm.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Aspects of the disclosure relate to an operating system and application(s) on a computing device, such as a smartphone or client computing device, that may function in concert to detect a selection of a mode setting by, for example, a user of the smartphone. The mode setting may be a low-power power save mode setting or other mode setting. Through the setting of the mode setting on the computing device, the behavior/operation of applications installed/executed on the computing device, such as a server computing devices and/or a client computing device, may be modified to accommodate the desired mode setting.

Figure 1:
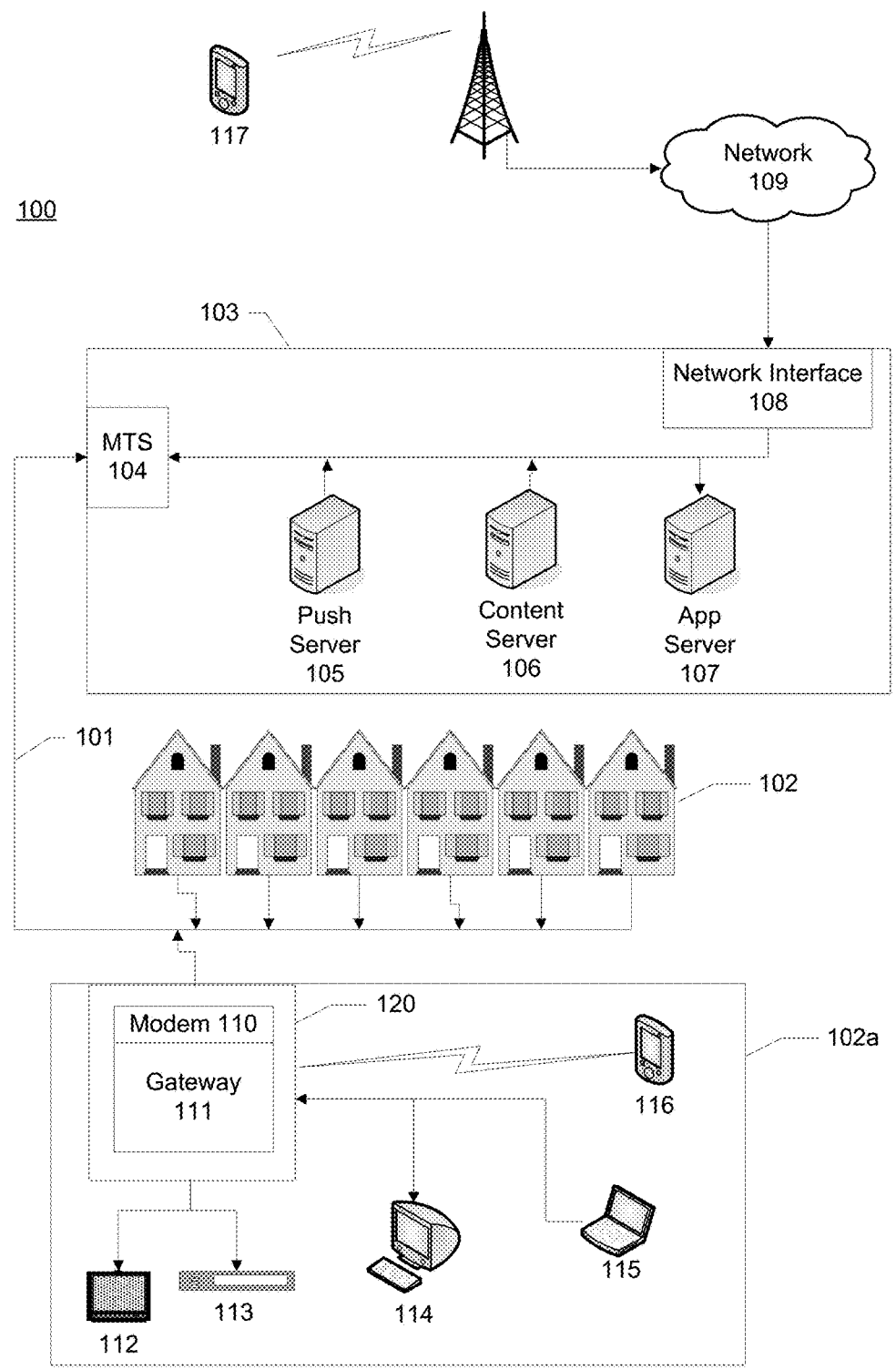
FIG. 1 illustrates an example information distribution network.

FIG. 1 illustrates an example information distribution network 100 on which many of the various features described herein may be implemented. The illustrated information distribution network is only one example of a suitable network and is not intended to suggest any limitation as to the scope of use or functionality of the disclosure. The illustrated network should not be interpreted as having any dependency or requirement relating to any component or combination of components in an information distribution.

Network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other suitable type of information distribution network or combination of networks. For example, network 100 may be a cellular broadband network communicating with multiple communications access points, such as wireless communications tower 130. In another example, network 100 may be a coaxial system comprising a cable modem termination system (CMTS) communicating with numerous gateway interface devices (e.g., gateway interface device 111 in example home 102a). In another example, the network 100 may be a fiber-optic service system comprising optical fibers extending from an optical line terminal (OLT) to numerous optical network terminals (ONTs) communicatively coupled with various gateway interface devices. In another example, the network 100 may be a digital subscriber line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other suitable network architectures now known or later developed.

Network 100 may use a series of interconnected communication links 101 (e.g., coaxial cables, optical fibers, wireless links, etc.) to connect premises such as homes 102 or other user environments to local office 103. Communication links 101 may include any suitable wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other suitable components for communicating data. Data may include, for example, internet data, voice data, weather data, content data, and any other suitable information. Content data may include, for example, video content, audio content, media on demand, video on demand, streaming video, television programs, text listings, graphics, advertisements, and other content. A content item may represent an individual piece of content, such as a media content item (e.g., a particular movie, television episode, online video clip, song, audio recording, image, or other media content) or any other data. In some instances, a content item may be fragmented into segments, such as a plurality of two-second video fragments that may be separately addressed and retrieved.

Local office 103 may transmit downstream information signals onto communication links 101, and premises such as home 102 may receive and process those signals. In certain implementations, communication links 101 may originate from local office 103 as a single communications path, and may be split into any suitable number of communication links to distribute data to homes 102 and various other destinations. Although the term home is used by way of example, homes 102 may include any type of user environment, such as single family homes, apartment complexes, businesses, schools, hospitals, parks, and other suitable environments and combinations of environments.

Local office 103 may include interface 104, which may be a computing device configured to manage communications between devices on the network of communication links 101 and backend devices, such as server 105, server 106, and server 107. For example, interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in homes 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol networks, cellular communications networks (e.g., Global System for Mobile Communications (GSM), Code Division Multiple Access (CDMA), and any other suitable 2nd, 3rd, 4th and higher generation cellular communications networks), cellular broadband networks, radio access networks, fiber-optic networks, local wireless networks (e.g., Wi-Fi, WiMAX), satellite networks, and any other suitable networks or combinations of networks.

Local office 103 may include a variety of servers that may be configured to perform various functions. Local office 103 may include one or more push servers 105 for generating push notifications to deliver data, instructions, or both to devices that are configured to detect such notifications. For example, push server 105 may transmit an instruction to a device to transfer service from one wireless network or communications access point to another wireless network or communications access point. Local office 103 may include one or more content servers 106 configured to provide content (e.g., media content) to devices. Local office 103 may include one or more application servers 107. For example, application server 107 may be used to implement a caching device, such as a cache server, for the content stored in or provided by content server 106. In other examples, the computing device 106 may be configured to provide the functionality of content servers and application servers.

Homes 102 may include a single family home, an apartment, an outdoor restaurant, an office suite, or any other suitable indoor environment and extend to an outdoor environment. Example home 102a may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other suitable device or combination of devices. In certain implementations, device 110 may be a part of, or communicatively coupled to, gateway interface device 111. Gateway 111 may be, for example, a wireless router, a set-top box, a computer server, or any other suitable computing device or combination.

Figure 2:
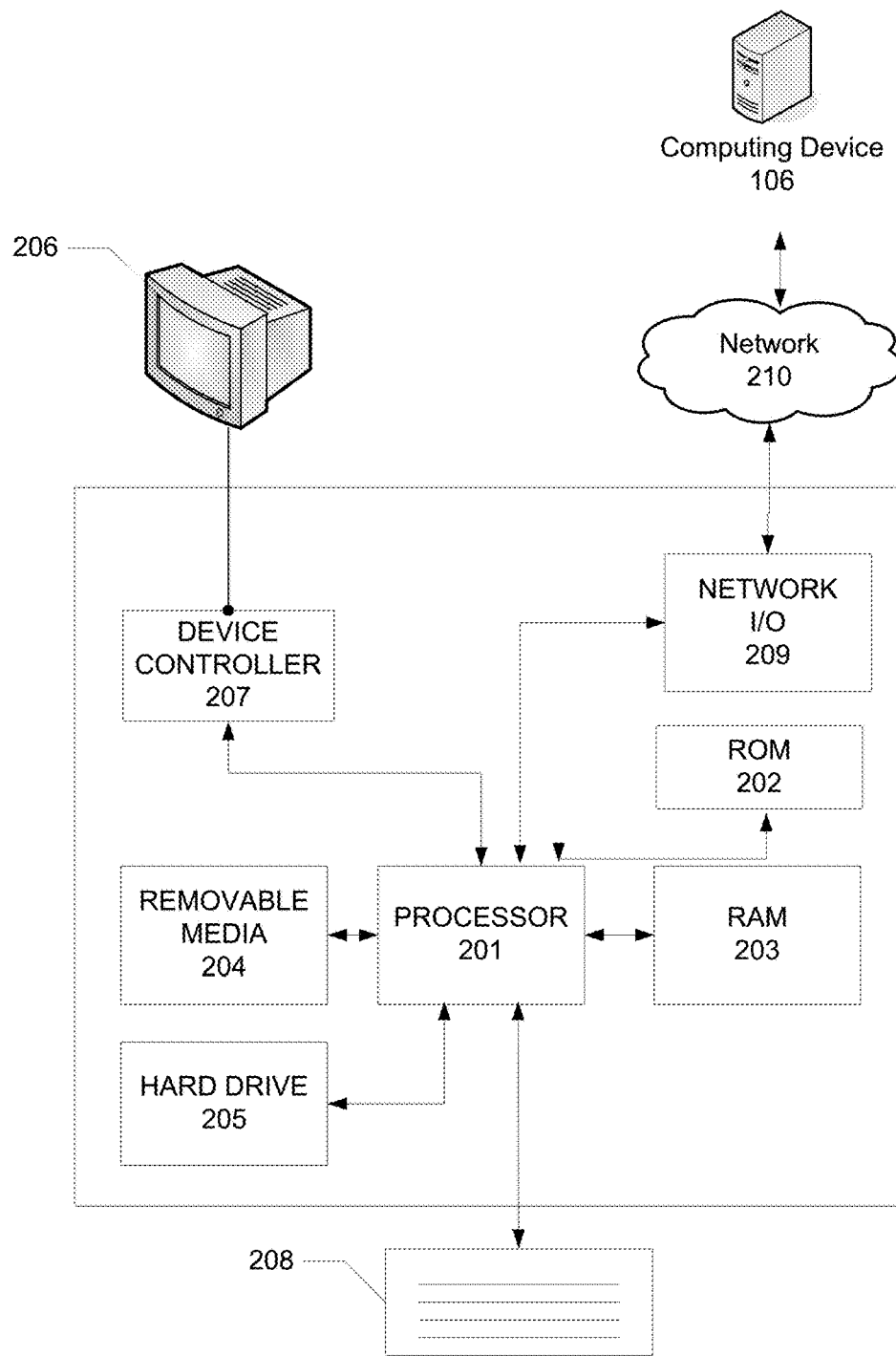
FIG. 2 illustrates an example hardware platform on which the various elements described herein can be implemented.

Gateway interface device 111 may be any suitable computing device for communicating with device 110 to allow one or more other devices in example home 102a to communicate with local office 103, one or more external networks 109, or other devices communicatively coupled thereto. Gateway 111 may include local network interfaces to provide communication signals to user devices in or near example home 102a, such as television 112, set-top box 113, personal computer 114, laptop computer 115, wireless device 116 (e.g., a wireless laptop, a tablet computer, a mobile phone, a portable gaming device), vehicular computing system 117 (e.g., a mobile computing system, navigation system, or entertainment system in an automobile, marine vessel, or aircraft) and any other suitable device FIG. 2 illustrates general elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The various computing devices, servers and hardware described herein may be implemented using software running on another computing device.

In one example, a computing apparatus 200 (e.g., a client computing device, a laptop 115, a personal computer 114, a smartphone 116, a tablet, or other apparatus) is disclosed equipped with the ability to permit selection of a mode setting. Examples of mode settings include, but are not limited to, a power mode setting, network connectivity setting (e.g., wireless connection, wired connection, Bluetooth, others), processor load setting (e.g., high load, low load, others), memory availability/usage setting (e.g, 10% utilization, 50% utilization, others), GPS settings (e.g., ON, OFF, others), camera configuration (e.g., front camera ON, rear camera ON, others), and other mode settings. The computing apparatus 200 may receive a selection (e.g., a manual user selection, a fully-automated selection, a partially-automated selection) of a mode setting (e.g., a power mode setting). An application (e.g., an Internet web browser) executing on the computing device may insert an indication of the selection of the mode setting in a request for content. That request for content, including the indication of the selection of the mode setting, may then be sent via an interface to a communication network 210 to another computing device 106, such as a server computing device. In some examples, the indication of the selection of a mode setting may be the actual mode setting itself (e.g., power save mode), or in other examples it may be information that the computing device 106 may use to determine a mode setting selection.

As a result of sending the request for content, the application on the computing apparatus 200 may receive from another computing device 106 (e.g., a content data store or content source) through an interface to a communications network 210, either directly or indirectly, content corresponding to the request for content. The content may be based on the mode setting selection. For example, if the mode setting indicates that the computing device is in a low power or power conservation mode, then the other computing device 106 may respond by providing a version of the content that omits certain features, such as animations, to help reduce the power needed to render the requested content. Conversely, if the mode setting is a normal power mode, then the computing device 106 may respond by providing a version that includes the features, such as animations, that require additional processing power to render. The computing device 106 may store different versions of the requested content, corresponding to different mode configurations (e.g., client mode configurations), and may supply the most appropriate version of the requested content based on the requesting device's current mode.

Some examples of a power mode setting include, but are not limited to, a low-power "power save mode," a normal power mode, a high-power "performance power mode," and/or other power modes. The selection of a power mode setting may, in some examples, result in a customization of the content received from a remote computing device 106. For example, displaying/rendering the content received in response to a high-power performance power mode may consume more power on the computing apparatus 200 than displaying/rendering the content received in response to a low-power power save mode. Likewise, outputting for display the content received in response to a high-power performance power mode may consume more power on the computing apparatus 200 than outputting for display the content received in response to a normal power mode. Furthermore, displaying/rendering the content received in response to a normal power mode may consume more power on the computing apparatus 200 than displaying/rendering the content received in response to a low-power power save mode.

Alternatively, in some examples, a remote computing device 106 may send a plurality of content to a local computing device 200 in response to a request for content, and then an application on the local computing device 200 may filter the received content based on the user selection of the mode setting. In such an example, the amount of content sent to the local computing device 200 (e.g., network bandwidth consumption) may be greater, and the processing load on the remote computing device 106 may be reduced because the remote computing device 106 may respond regardless of a particular mode setting (e.g., power mode setting) at the local computing device 200. Meanwhile, the processor and memory consumption at the local computing device 200 may be increased because it buffers the received content, filters it, discards the content that the filter determines is foreign to the particular selected mode setting, and renders/displays/processes that content which corresponds to the selected mode setting. For example, a hypertext markup language (HTML) file or other type of web content may include tags identifying portions of the content for use only in particular mode settings. Nevertheless, in the aforementioned example, the remote computing device 106 may ambivalently transmit the entire HTML file to the local computing device 200 for filtering there. In some instances, the HTML file may include code to pre-load (or pre-buffer) images or other multimedia content at memory 203 of the local computing device 200. The application (e.g., Internet web browser) executing on the local computing device 200 may use the mode setting selection to filter and process the appropriate content.

In another example, the processing load on the computer processor of the computing device 106 may be reduced by offloading some functionality/capabilities to another computing device. For example, determination of the mode setting selection may be designated to a computing device that may asynchronously determine the mode setting, and then share that mode setting with the another computing device 106. In a similar vein, other processing capabilities/features may be delegated to a different machine and then the results of computations may be communicated to the computing device 106.

In some examples, the system described herein receives mode settings (e.g., power mode settings) that are external to the application (e.g., web browser). For example, a web browser may not have a particular power mode setting. Rather, the computing device (e.g., smartphone 116) may have a setting for selection of a desired power mode. A user may select, in one example, a desired power mode outside of the context of a specific application (e.g., web browser), but in association with the computing device 200. That indication of a power mode setting may be separately communicated to the application (e.g., web browser) such that the behavior of the application may be modified based on the indication of the power mode setting. In contrast, a particular web browser type (e.g., a mobile phone browser, desktop browser, etc.) or version (INTERNET EXPLORER™, MOZILLA™, SAFARI™, CHROME™, etc.) is defined in the context of a web browser; in other words, these attributes are not selected/determined outside of the limited context of the web browser. For example, these attributes are not device context information, rather they are application-specific attributes. In existing systems, HTML files may include tags or scripts that distinguish between different web browser types and versions, and the web browser may disregard portions of the HTML file based on these tags/scripts that regulated based on the particular web browser type. In addition, the web browser type and version values are used in the context of the specific web browser. As such, web browser type and version values are not a mode setting selection that is set external to (e.g.,  independent of) the application and used with other applications that may be installed and/or executing on the computing device 200.

In another example, a smartphone 116 may have smartphone applications installed and/or executing on it. Independent of the installation and/or execution of the applications on the smartphone 116, the user of the smartphone 116 may be able to set one or more desired mode settings, either expressly or implicitly. For example, the user may expressly set the smartphone 116 on a low power consumption mode (e.g., power save mode) to conserve battery power. The smartphone 116 may be equipped with a hardware switch to toggle between different mode settings (e.g., power mode settings). Alternatively, the smartphone 116 may be equipped with software (e.g., via operating system modules, via plug-ins or patches to the operating system, via firmware such as BIOS, or other computer-executable instructions) to toggle between different mode settings (e.g., power mode settings). The user selection of the mode setting in any event, as described in the preceding examples, is external to and independent of the applications (see FIG. 3, refs. 302, 304) executing on the computing device 200. As such, the user selection of the mode setting may be used pervasively amongst any applications 302 configured to receive the aforementioned mode setting(s).

In another example, the user may set the screen brightness on the smartphone 116 to a "low" mode setting to implicitly conserve battery drain. The aforementioned mode settings may be set through the operating system (or other aspect) of the smartphone 116, independent of downloaded smartphone applications that may already be (or will be) installed on the smartphone 116. As such, the mode settings may be external to the applications on the smartphone and independent of the applications. Unlike the prior example involving a power mode setting switch, the user's action in setting screen brightness to "low" may not necessarily be dispositive of the user's desire to conserve battery drain. In some examples, the computing device 200 may further include computer-executable instructions in the form of logic and/or rules to further enhance the determination of a mode setting (e.g., a power mode setting). For example, a user may select a brightness setting of a user display of the computing device 200. A desired mode setting (e.g., power mode setting) may be calculated based on the information received corresponding to the user-selected brightness setting of the user display. The desired mode setting may be selected by the computer processor 201 on the computing device 200 accordingly.

The calculation described above may involve one or more rules/logic that considers various factors in calculating a desired mode setting. In one example, if the user has set the screen brightness setting to less than fifty percent of its maximum possible value and the power source of the computing device 200 (e.g., smartphone 116) is via a battery, then the rules/logic may calculate a desired power mode setting of power save mode for the device. Meanwhile, if all things are the same, but the power source of the computing device 200 is not via a battery (e.g., via a wall outlet), then the rules/logic may calculate a desired power mode setting of high-power power performance mode. Likewise, other rules/logic will be apparent after review of the entirety disclosed herein.

While in the preceding example the mode setting was calculated at the computing device 200 using one or more inputs (e.g., the user-selected screen brightness setting, and whether or not the power source was a battery), in other examples the desired mode setting may be calculated external to the computing device 200, and then sent to the computing device 200. For example, in some instances, the computing device 200 may communicate raw inputs to a remote server machine, which is programmed with one or more rules/logic to calculate one or more desired mode setting and send the calculated mode settings to the computing device 200. At least one advantage of such a configuration, in some examples, may be to reduce the processor load on the computing device 200, especially when the processor 201 on the device may be unsuited for such types of computations.

In another example, the mode setting (e.g., power mode setting) on a computing device 200 may be based on the load being experienced at a computer processor 201 of the computing device 200. The load may be a real-time, current load on the processor 201, or may be a historical load on the processor 201, or a combination of the two. Information corresponding to the current, real-time load on the one or more processors 201 of the computing device 200 may be used to calculate a desired power mode setting. The calculated desired power mode setting may be recorded and used as the selected mode setting for the computing device 200. The load on the one or more processors 201 may be monitored using aspects of the operating system of the computing device 200, such a real-time power consumption module. The module may be built into the operating system and/or provided as a tool to graph the usage of one or more resources (e.g., memory usage, network consumption, processor load, battery usage, etc.) of the computing device 200. In some examples, the logic/rules for selecting a power mode setting based on processor load may include: setting the selection of the power mode setting to a high-power performance power mode when the real-time load on the at least one computer processor 201 is approximately less than half of a maximum load on the at least one computer processor 201; and setting the selection of the power mode setting to a power save mode when the real-time load on the at least one computer processor 201 is approximately greater than half of the maximum load 201. Nevertheless, in some examples, the processing load on the processor 201 may be measured by the amount of time it takes to process a webpage or particular content.

In yet another example, the mode setting (e.g., power mode setting) on a computing device 200 may be based on whether or not a power supply or internal battery is powering the device. Based on information identifying that an internal battery is a current power supply of the computing device 200, the processor 201 may select a desired mode setting for the computing device 200. The information may indicate whether the internal battery is above a predetermined threshold (e.g., at least 50% charged) and/or whether the computing device 200 is plugged into a power outlet. Based on the received information about the power supply of the computing device 200, the power mode setting may be updated.

In the preceding examples, the operating system of the computing device 200 is separate and apart from the applications installed on the computing device 200. In such examples, the operating system and application(s) may function in concert to detect, by the operating system, any selection of a mode setting by, for example, a user of the computing device 200. The operating system may record an indication of the selection of the mode setting in a predetermined variable in computer memory 203 on the computing device 200. Subsequently, an application executing on the computing device 200 may access the value stored in the predetermined variable and modify the application's performance/behavior accordingly. For example, if the predetermined variable corresponds to a power mode setting, the application may identify that a low-power power save mode value is desired. The application may customize its operation and functionality to accommodate the desired power save mode. For example, the application may request lower resolution (e.g., smaller size) graphics from a computing device 106 and substituted for larger size, higher-resolution graphics. Likewise, still photos may be substituted for video clips; or the application may modify its operations to request audio-only instead of motion video. In another example, if a mode setting (e.g., screen brightness of the computing device 200) is low, the application may modify its operation to request images with less color depth (e.g., 16-bits of color depth instead of 32-bits of color depth) because the breadth of colors might not be discernible at the current screen brightness/contrast settings. In short, the behavior/operation of an application executing on a computing device 200 may be adjusted such that multimedia is displayed/rendered differently in accordance with current device context information (e.g., mode settings of the computing device 200). Other examples of such adjustments will be apparent upon review of the entirety disclosed herein, including but are not limited to, other mode settings associated with the computing device 200 such as settings based on machine resource use, settings based on network connection, settings based on display, settings based on software version, settings based on system context, settings based on events context, and other settings associated with the computing device 200.

For example, regarding machine resource use, a mode setting indicating the processing power of the computing device 200 (e.g., how good the processor is) may be used to modify the operation of the application. Likewise, regarding machine resource use, a mode setting indicating the processing use of the computing device 200 (e.g., how fast the system is actually running given the other operations on the system) may be used to modify the operation of the application. In addition, regarding machine resource use, a mode setting indicating the total memory with respect to random access memory (RAM) may be used to modify the operation of the application. For example, regarding network connection, a mode setting indicating expected network bandwidth (e.g., how good the connection is on spec—4G, 100 Mbps, etc.) may be used to modify the operation of the application. Likewise, regarding network connection, a mode setting indicating actual current network bandwidth (e.g., 745 kbps) may be used to modify the operation of the application. In addition, regarding network connection, a mode setting indicating WiFi versus cellular versus hardwired pay per byte versus unlimited cellular usage left in the month and how many days until reset may be used to modify the operation of the application.

For example, regarding display, a mode setting indicating screen brightness, screen color palette, speakers present, current volume on speakers, display present, is screen reader ON, is an external display present, screen size, and/or a combination of one or more of the aforementioned display mode settings may be used to modify the operation of the application. For example, regarding versions, a mode setting indicating operating system (OS) version, browser version, and/or a combination of the aforementioned may be used to modify the operation of the application. For example, regarding system context, a mode setting indicating location, security setting, light sensor, and/or a combination of one or more of the aforementioned may be used to modify the operation of the application. For example, regarding software context, a mode setting indicating what other apps are installed, what other apps are in operation, logged into social media, number of social media friends, live communication (e.g., phone call) in progress, and/or a combination of one or more of the aforementioned may be used to modify the operation of the application. For example, regarding events context, a mode setting indicating external events (e.g., bad weather, amber alert, emergency broadcast, other news events, or other events), general weather, and/or a combination of the aforementioned may be used to modify the operation of the application. For example, regarding power/battery, a mode setting indicating power mode, power source (e.g., battery, plugged in, wireless charging, or other source), battery life, battery life percentage, or a combination of one or more of the aforementioned may be used to modify the operation of the application. In other words, the behavior/operation of an application executing on a computing device 200 may be adjusted such that the operation of the application is changed.

In another example, the application may send information to a remote computing device 106 to indicate the mode setting (e.g., desired power mode setting) on a local computing device 200. As a result, the remote computing device 106 may also customize its operation and functionality to accommodate the desired power save mode. Overall, through the setting of a value of a mode setting on the local computing device 106, the system is able to modify the behavior/operation of applications installed/executed on the local computing device 200 as well as any remote computing devices 106.

In the preceding examples describing mode settings, the behavior of the application installed on a computing device 200 is affected by the mode setting. The application may take advantage of an interface with the computing device 200 (e.g., smartphone 116) to obtain the values of one or more mode settings. For example, the operating system of the computing device 200 may store the desired mode settings in a registry file, or comparable file or predetermined computer memory location, that may be readily accessed by the application. In another example involving mobile operating systems that operate in a compartmentalized sandbox configuration, the values of mode settings may be passed to the application as initialization parameters upon launch/execution of the application. Any updates to the values of the mode settings may be sent to the application in the form of notifications, IRQ interrupt requests, and/or other form of real-time alerts.

While the preceding paragraph discusses some of the approaches for passing mode setting values between an operating system (or other device-level system, such as firmware or hardware) to a specific application on a local computing device 200, other system/methods may be used to pass desired mode setting values between the application and a remote computing device 106. For example, in implementations involving hypertext transfer protocol (HTTP) communication, the HTTP header may be enhanced to carry pertinent information. In another example, the document object model (DOM) of a web page may be enhanced to include pertinent information. In yet another example, a file or similar structure, such as a cookie in a web browser, may carry pertinent information for sharing between the local computing device 200 and a remote computing device 106. Although three approaches are described above, other approaches and/or hybrid approaches are contemplated herein.

Figure 3:
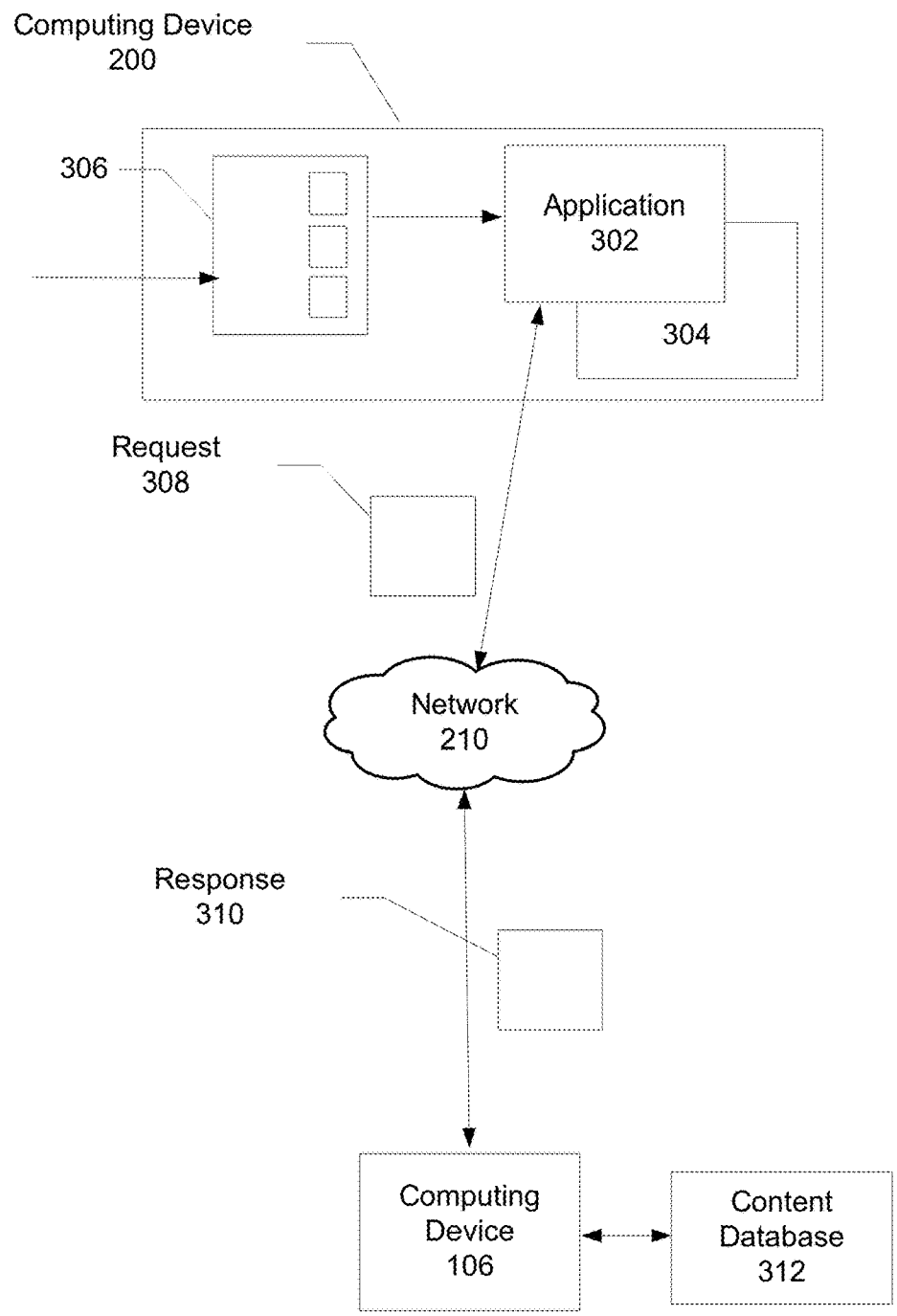
FIG. 3 illustrates a system according to one or more aspects of the disclosure.

In one example, referring to FIG. 3, an application 302 on a computing device 200 may send a request for content to a remote computing device 106. The request may be formatted and communicated in hypertext transfer protocol (HTTP). The request may include an indication of the selection of the mode setting. The indication may be inserted into the hypertext transfer protocol (HTTP) header of the HTTP request 308. In some examples, the insertion may occur automatically and may become a commonly-recognized attribute of the HTTP request 308. For example, a power mode attribute/parameter may be added to the HTTP header, and "power save," "normal," "performance," or other values may be designated for the power mode name-value pair in the HTTP header. Other name-value pairs are contemplated for addition to the HTTP header to correspond to the possible mode settings available on a computing device 200.

FIG. 3 will be used to continue discussion of the preceding example, however, FIG. 3 relates to other aspects as well. In communications that may be implemented using the architecture of FIG. 3, a "power save" value may indicate that a user wishes to use as little power as possible. Meanwhile, "normal" value may indicate that the user wishes a regular web experience. Finally, a "performance" value may indicate that the user wishes the best experience possible regardless of how much power or other resources are consumed. A remote computing device 106 (e.g., a web server, or any computing device capable of hosting, accessing, and/or transmitting content) may receive messages with data, such as HTTP header name-value pairs, process them, and adjust its operation/behavior accordingly. In some examples, a web server may receive HTTP header name-value pairs, but simply ignore/disregard them. For example, in the case of a legacy web server authored before existence of a "power mode" name-value pair in the HTTP header, the legacy web server may receive all HTTP header name-value pairs, but disregard those name-value pairs that are unrecognized. In other words, the new name-value pairs may provide backwards compatibility with existing computing devices.

Continuing with the preceding example, an application receiving on, or accessible by, device 200, such as application 302, may receive information from a computing device 200, which may be a user device or another device associated with rendering and/or presenting content. As illustrated in FIG. 3, the module 306, which may be comprises of hardware and/or software, may provide an interface between the application 302 and one or more mode settings of the computing device 200. In some examples, the module 306 simply passes the values of one or more mode settings (e.g., power mode settings) to an application 302, 304. In other examples, the module 306 may process one or more inputs to calculate the value of a mode setting, then send that calculated value to an application 302, 304. For example, the processing, e.g., calculations, may be performed in real-time or at a recurring interval of time. The real-time processing may include analyzing current load on one or more processors, current usage of network components, current memory consumption readings, real-time system bus usage, and other hardware/software metrics. Notably, the module 306 may share values of one or more mode settings to a plurality of applications. As such, the mode settings are independent of any one application and external to the applications 302, 304.

After receiving information from module 306, the application may incorporate the information (e.g., an indication of a desired power mode setting) into a communication message, such as a request 308, which may be an HTTP request, to be sent to a remote computing device 106. The information may be assembled into one or more name-value pairs in a HTTP header portion of the HTTP request 308.

The HTTP request 308 may, in some examples, comprise a request portion (e.g., "GET/ . . . ") with method, path, and protocol designations. The assembled HTTP request 308 may be sent to the remote computing device 106.

The remote computing device 106 may parse the HTTP request 308 and determine the desired mode settings of another computing device 200. The remote computing device 106 may modify its behavior/operation based on this desired mode setting. For example, if the mode settings indicate that a low-power power save mode is desired and that a high network bandwidth Internet connection is available, then the remote computing device 106 may modify the amount and characteristics of the content it sends to the application 302 to take advantage of the high bandwidth connection without sending content that requires heavy computations on the local- or client-side. Accordingly, the remote computing device 106 may assemble an HTTP response 310 in response to the received HTTP request 308. The HTTP response 310 may comprise a status line (e.g., "HTTP/1.x 200 OK"), a HTTP header portion, and a content portion. Based on the HTTP request 308, the content portion of the HTTP response 310 may include an image graphic, HTML content, multimedia content, or other content retrieved from a content database 312. The assembled content may be based on the desired mode setting received in the HTTP request 308. HTTP request 308 is just one example of a request and other format/type of requests are contemplated.

In another example, an application 302 on a local computing device 200 may send a request for content to a remote computing device 106. In lieu of, or in addition to, an enhanced HTTP request 308, the desired mode settings of the local computing device 200 may be transmitted to the remote computing device 106 as part of the path of the hypertext transfer protocol (HTTP). For example, the desired mode setting may be inserted into the request for content by inserting an indication of the selection of one or more mode settings into attributes of a document object model (DOM) associated with the application 302 on the local computing device 200. The attributes of the DOM may be inserted as part of the URL path of a HTTP communication from the local computing device 200 to the remote computing device 106. For example, the DOM may be extended to include a "powerMode" attribute that may be accessed through the browser object (e.g., browser.powerMode=["power save"|"normal"|"performance"]).

Using the DOM allows the application 302 to have decision-side capabilities. For example, using technologies such as AJAX and JavaScript, the application 302 (e.g., an Internet web browser) may reconfigure and/or reformat the content of a webpage so that those things that are high-power consuming items might be dropped or filtered out. As such, the decision to select and/or drop content may be performed on the local- or client-side using scripting technology and the DOM.

In yet another example, an application 302 on a local computing device 200 may send a request for content to a remote computing device 106. In lieu of, or in addition to, an enhanced HTTP request 308, the desired mode settings of the local computing device 200 may be transmitted to the remote computing device 106 as part of a cookie. For example, the indication of the selection of one or more mode setting may be stored in a cookie by the application 302. The name-value pairs comprising the cookie may be inserted into a header of the request for content. As such, similar to the example where the HTTP header of the HTTP request 308 is enhanced to include additional name-value pairs, in this example, a cookie may be used to share the desired information with another computing device 106. This computing device 106 may store the cookie for the session and use the preferences identified in the cookie (e.g., power mode setting preferences) for the entirety of the session.

Figure 5A:
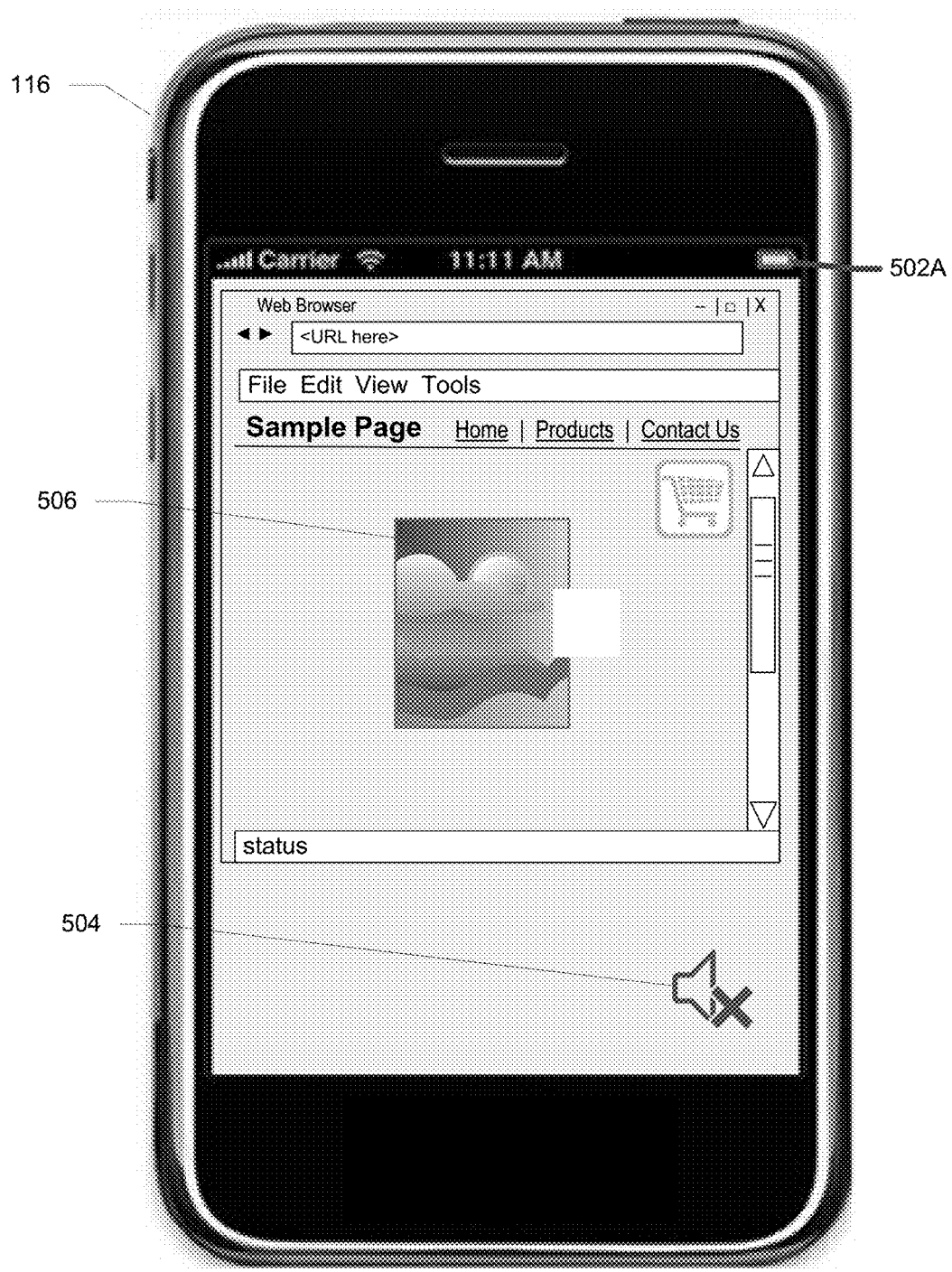
FIGS. 5A, 5B, and 5C illustrate a computing device providing device context information to an application executing on the computing device.
Figure 5B:
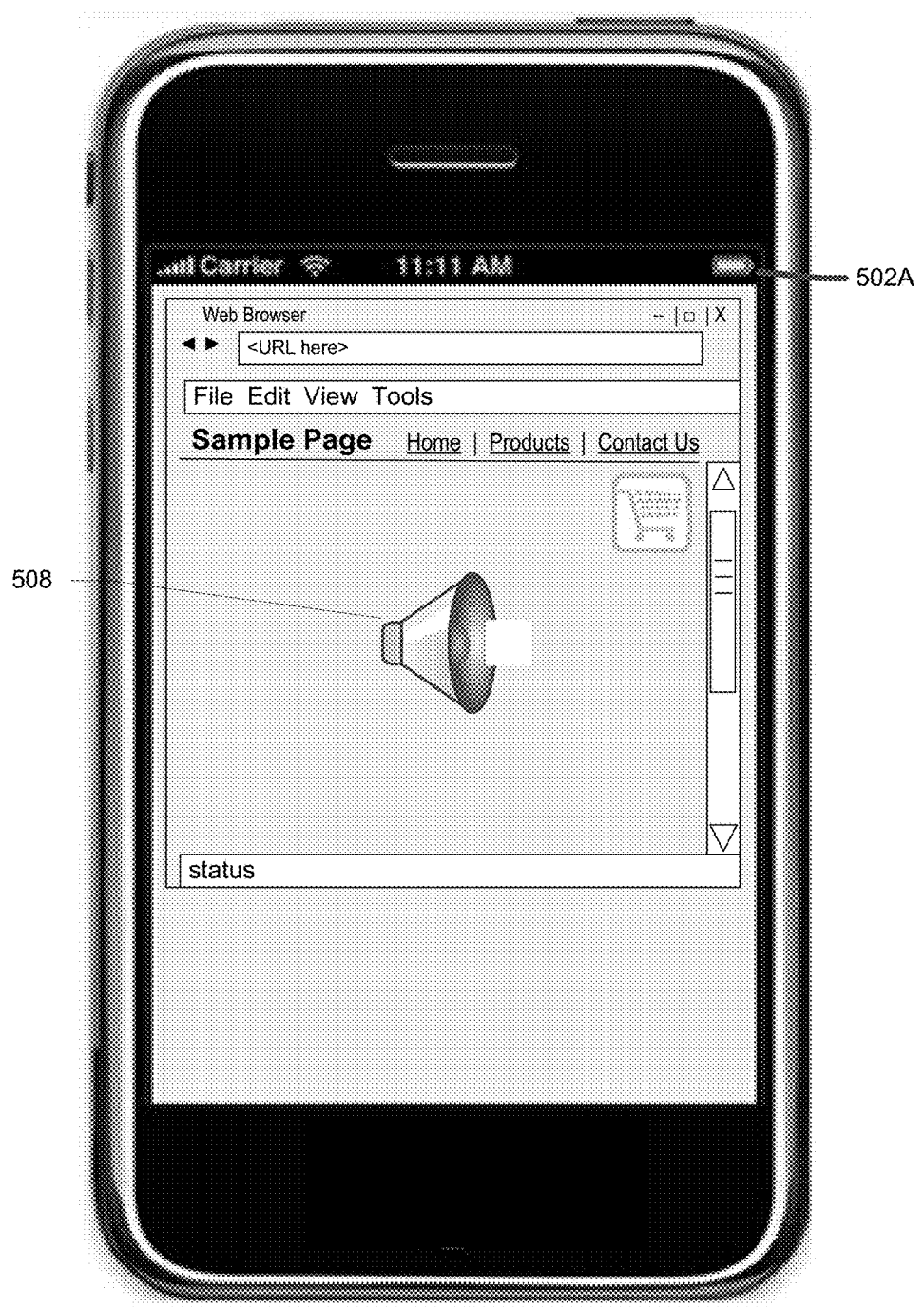
Figure 5C:
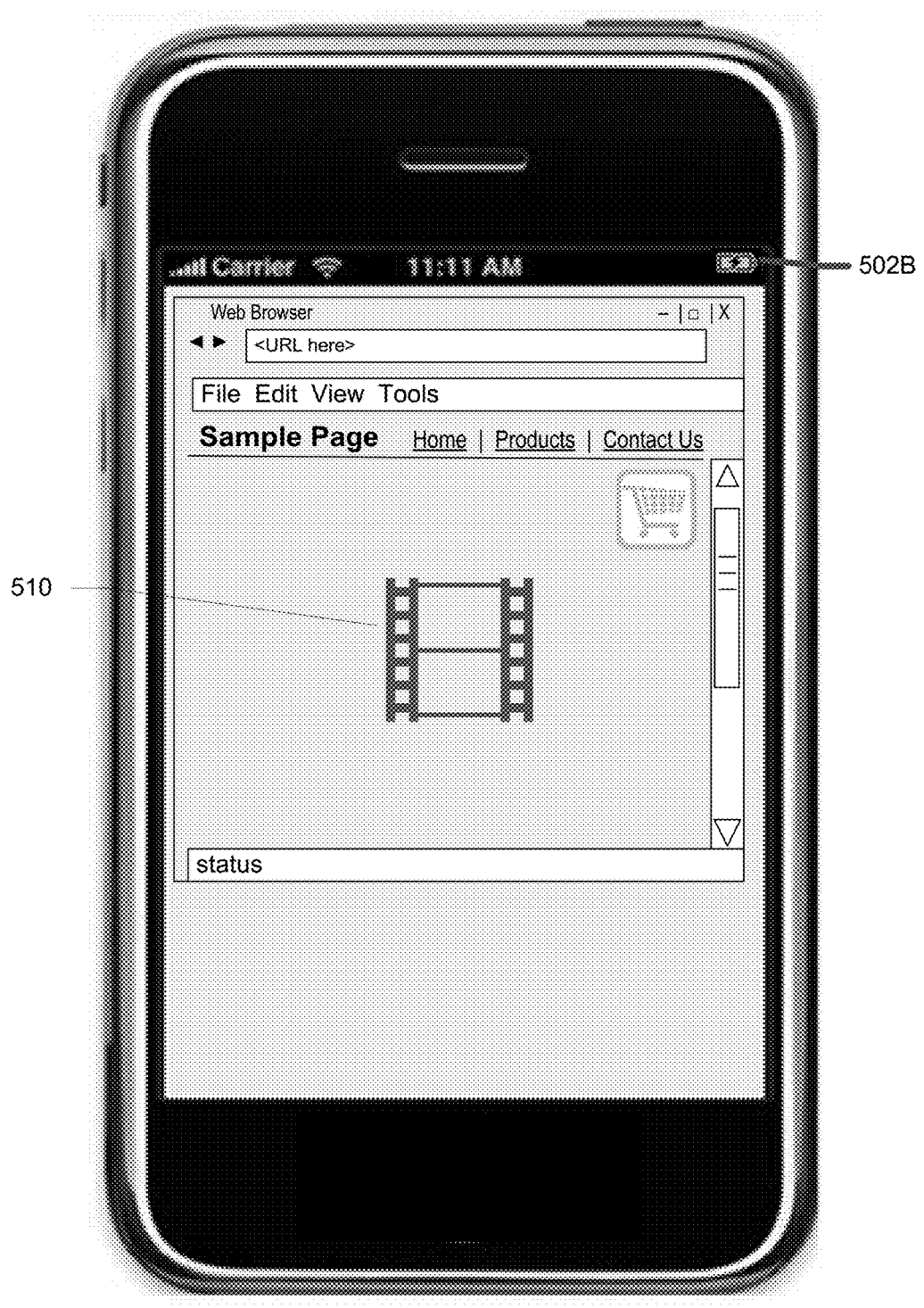

Referring to FIGS. 5A, 5B, and 5C, a computing device 200 (e.g., a user device such as a smartphone 116) may provide device context information (e.g., one or more mode settings) to an application (e.g., web browser application) executing on the smartphone 116. When the web browser application sends a request for content to a server machine 106 corresponding to a requested uniform resource locator (URL), the web browser application may include with the request one or more mode settings. The web browser application may include the smartphone's current battery level, whether the smartphone is running on an internal battery power or being powered by an external source, whether the smartphone's audio output is muted or not, and other device context information. For example, in FIG. 5A, the web browser application includes the smartphone's current battery level (e.g., 80% of maximum charge), whether the smartphone is running on an internal battery power or being powered by an external source (e.g., internal battery source 502A), whether the smartphone's audio output is muted or not (e.g., audio muted 504), and/or other device context information. As a result, in the example of FIG. 5A, the web browser application displays the requested content as an image 506.

Meanwhile, in the example of FIG. 5B, the smartphone 116 is not muted and is running on an internal battery 502A with a nearly full charge. As a result, in the example of FIG. 5B, the web browser application outputs the requested content as an audio file 508 with no image. In yet another example, the smartphone in the example of FIG. 5C is plugged into a wall outlet that is charging 502B the internal battery and the smartphone's audio is unmuted. The aforementioned device context information, inter alia, is sent to a remote machine 106 in the request for content. In one example, the remote machine 106 may analyze the device context information and determine that a full-resolution video file 510 is to be sent to a local computing device 200 in response to the request for content. The remote machine 106 may comprise computer-executable instructions that, when executed by one or more processors of the remote machine 106, may cause the remote machine 106 to determine whether, based on the device context information (e.g., mode settings) of the local computing device 200, to send one or more of a plurality of content choices (e.g., full-resolution video file 510, low-resolution video file, audio-only file 508, image 506, low-resolution image, or other content). Some mode settings may include settings manually selected by a user, regardless of the actual device status, such as a power mode setting; the user of a smartphone 116 may toggle between a power save mode and performance power mode. The power mode setting may be included as part of the device context information. In yet another example, the determination of which content to render at the local computing device 200 may occur, either in part or entirely, by a processor 201 of the local computing device 200.

In one example, a processor 201 of a computing device 200 may determine which content to download to the computing device 200 based on resource constraints (e.g., power, bandwidth, processing capacity, RAM—as a component) and will download more or less content accordingly. In other example, the processor 201 may determine to download less content if the computing device 200 is approaching (or already exceeding) the data usage capacity allocated to it on a cellular network. The device may display downgraded pictures (e.g., less colors, grayscale, less resolution, etc.) for particular screen settings (e.g., screen brightness). Similarly, the device might not download audio if the processor 201 determines that audio output is set to OFF. Likewise, upon detecting a non-visual user of a computing device 200, the processor 201 may select a mode that results in pictures and/or animations not being downloaded. Such a situation might arise when the screen reader feature is ON and no display is present (or is off/in sleep mode).

In another example, a processor 201 of a computing device 200 may determine that the device has older/legacy software (or software version) installed on it and determine that the device (and/or device user) is satisfied with less modern content, which is smaller in size than more modern content. In yet another example, the processor 201 may show less security sensitive content after determining that the device (or software executing on the device) has a high security settings and/or has security relevant applications. Furthermore, the processor 201 may use light sensor in the computing device 200 and/or other components/modules to determine that the device is located outside and exposed to direct sunlight; and modify behavior of the application to display more contrasting pages and images easier to view in such environments.

In yet another example, if a user of a computing device 200 does not have many social connections (e.g., friend connections) on his/her social network account or contact list, the application's operation may be modified to not show social media content until manually requested. Likewise, based on those application detected as being installed or being used on the computing device 200, the content delivered to the computing device 200 may be filtered accordingly; for example, if the computing device 200 does not have a social media application installed, content delivered to the device from social media platforms may be limited. In contrast, if the computing device 200 has a remote control application installed on it, then television show content may be delivered to the device. In another example, if the computing device 200 is actively communicating (e.g., voice data is being communicated over a telephone/VoIP/audio application or the keypad is being used to type a message), the frequency at which updates are sent to the computing device 200 may be increased. Likewise, the frequency may be increase if there are local and/or national events (news events, bad weather, emergency broadcasts, etc.). Along these lines, other examples of how device setting may be used with rules relating to how and/or when content is delivered and/or rendered are contemplated herein.

Figure 4:
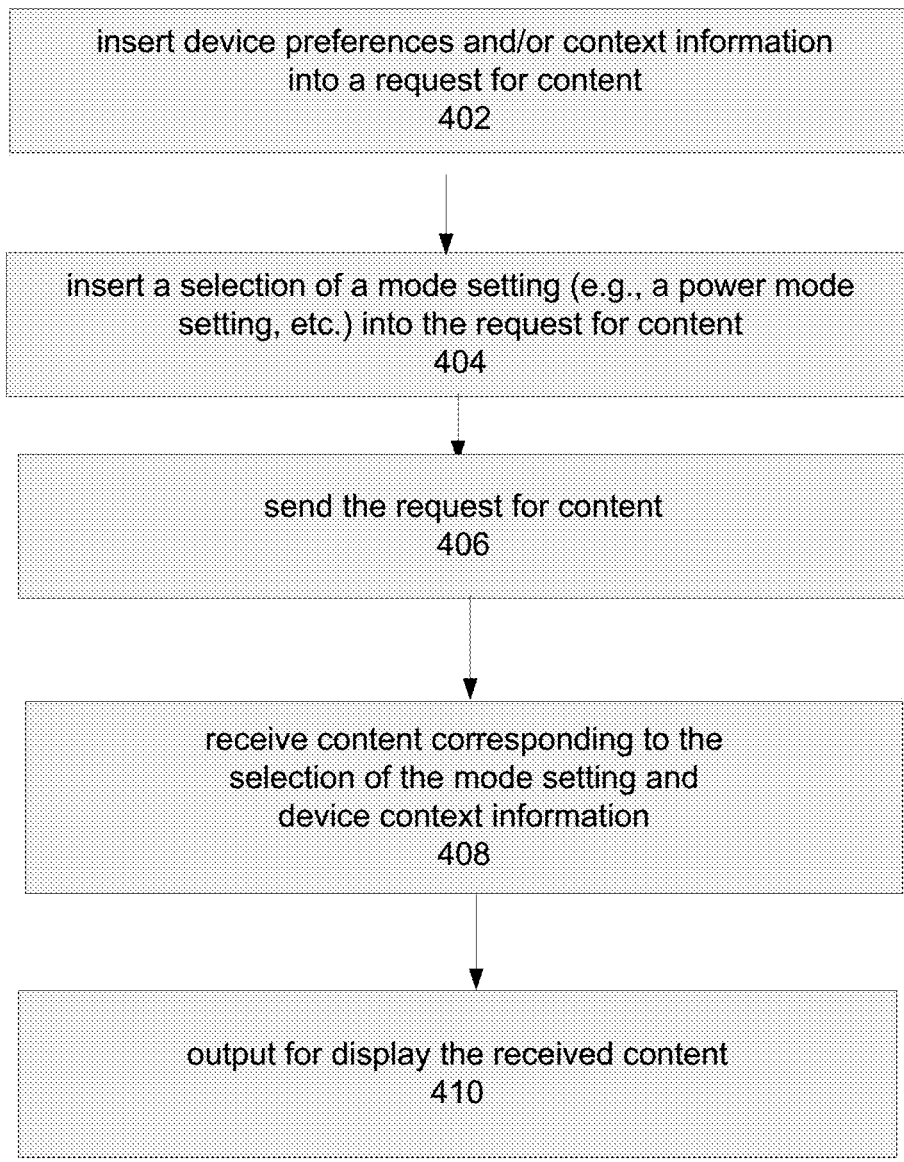
FIG. 4 illustrates a flowchart according to one or more aspects of the disclosure.

Referring to FIG. 4, a device, using for example application 302, 304, may prepare a request to be sent to a device, such as computing device 106, to obtain content. The application 302 may receive a selection of a mode setting (see representative blocks in module 306 in FIG. 3), such as a power mode setting, based on for example, user preference or a current load on a processor (e.g., processor 201 of the apparatus 200 and/or other factors). The selection of the mode setting may be inserted (step 404) into the request for content. Similarly, device preferences and/or context information, such as display brightness, display contrast, process load, memory usage, network bandwidth, microphone settings, camera settings, and other device settings, may be retrieved from a computing device 200, processed as necessary, and inserted (step 402) into the request for content. Thus, the aforementioned may be combined into an enhanced request for content. Once the application 302 has generated a request 308 for content comprising, inter alia, an indication of the selection of the power mode setting in a portion of the request 308 for content, the request 308 may be sent (step 406) to the remote machine 106. The indication of the selection of the mode setting may comprise a name-value pair in an HTTP header of the request 308, in one example. In another example, the indication may include a numeric value corresponding to different mode settings or levels. The application may send (step 406) the request 308 for content using a communication protocol, such as hypertext transfer protocol (HTTP). The application 302 may receive (step 408) the content 310, which corresponds to the request 308 for content, based on the selection of the power mode setting. The content may be a version of similar content, selected based on the request. The content may be packaged in an HTTP response 310, in one example. The content may comprises one or more of a first content when the selection of the power mode setting is a low-power power save mode, and a second content when the selection of the power mode setting is a normal power mode, and a third content when the selection of the power mode setting is a performance power mode. Finally, in step 410, the application may output for display the received content such that displaying the first content consumes less power on the apparatus than displaying the second content, and displaying the second content consumes less power on the apparatus than displaying the third content. In short, the appropriate content outputted for display is commensurate with the desired mode setting selected for the computing device 200.

As explained in an earlier example, some legacy systems (e.g., web servers, client applications, etc.) may not be equipped to receive and process one or more of the mode settings described herein. Such systems may simply disregard these values and proceed as they normally would. In other words, the system may be designed to offer backwards compatibility with existing client-server computing systems. Web page authors and/or application developers of new systems may insert flags/tags into their content to indicate which content is permitted/designated for particular mode settings. The content may comprise tags delimiting start points and end points of the first content and the second content. For example, a high-resolution file and a low-resolution file of the same image may be saved at database 312, and designated as high-power performance power mode and low-power power save mode, respectively. Based on the selected mode setting, a remote computing device 106 may provide the appropriate content to a local computing device 200. For example, each element on a web page (or other formatted content) may include a parameter/tag to indicate when such element (e.g., a video, a sound effect, a portion of a page, an article on a page, or other elements) is to be included in the actual rendering of the page. For example, full-resolution video content in a web page may include a value for a power mode parameter in the video tag. The parameter may designate that the full-resolution video file should be delivered and rendered when the device context information and/or user selection of mode settings indicate accordingly.

Numerous rules/algorithms may be accessed at the remote computing device 106 to implement the parameter processing described above. Numerous rules/algorithms are possible in accordance with the various examples described herein. For example, the remote computing device 106 may receive the following device context information about a local computing device 200: 50% remaining memory capacity, microphone is off, volume is at thirty out of a maximum 100, brightness is at twenty of a maximum 100, and battery is at 50%. The remote computing device 106 may use this information to determine that the optimal content to provide to the local computing device 200 is low-resolution content corresponding to a power save parameter value in the elements of the requested web page content. In another example, the remote computing device 106 may send more video and drop audio for particular multimedia content. In yet another example, the remote computing device 106 may cut one video content and keep high-quality audio. In yet another example, the remote computing device 106 may lower audio quality and send two smaller video content. There are numerous factors that may be considered in the remote computing device's processing of the request for content, including, but not limited to those discussed herein.

In one example in accordance with various aspects of the preceding examples, a remote computing device 106 may be configured to receive (e.g., receive and process) an enhanced request for content. The enhanced request for content may comprise device context information and/or an indication of a user selection of a mode setting. The indication of the user selection of the mode setting may be located in a hypertext transfer protocol (HTTP) header of the enhanced request for content. The HTTP header may comprise name-value pairs corresponding to an indication of the user selection of a mode setting. In another example, the HTTP header may comprise name-value pairs corresponding to device context information. Although the enhanced request for content may be formatted and communicated in HTTP, other communication formats that permit communication between two computing devices are contemplated in accordance with the disclosure.

After receiving and processing the enhanced request for content, the remote computing device 106 may retrieve appropriate content, either stored at memory of the remote computing device 106 or in a memory in communication with the remote computing device 106. The appropriate content may be selected from among a plurality of different versions of the same content such that a first content may correspond to a first mode, a second content may correspond to a second mode, a third content may correspond to a third mode, and/or additional content may correspond to another mode. The appropriate content may be selected based on the user selection of the mode setting and/or the device context information received in the enhanced request for content.

Finally, the remote computing device 106 may transmit the retrieved content for display. The retrieved content may be one or more of the first content, second content, and/or the third content. The content may be selected and/or configured and/or formatted by the remote computing device 106 such that outputting the first content consumes less resources (e.g., power) than outputting the second content; and similarly, outputting the second content consumes less resources (e.g., power) than outputting the third content. In other words, the enhanced request for content may be sent to the same location (e.g., uniform resource identifier (URI) or uniform resource locator (URL), or other), but the particular content retrieved and transmitted will be different based on various factors. For example, the enhanced request for content may comprise a current load on a processor in the computing device requesting the content. Based on the current load value, the remote computing device 106, inter alia, may determine a power mode setting (e.g., a power save mode, a normal power mode, a performance power mode, and/or other power modes).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

It is noted that various connections are set forth between elements in the following description. These connections are described in general and, unless specified otherwise, may be direct or indirect; this specification is not intended to be limiting in this respect.

What is claimed is:

1. A method comprising:
   transmitting, by a first computing device and to a second computing device, a first request for first video content, wherein the first request comprises data indicating a first setting associated with the first computing device;
   receiving, by the first computing device and based on the data indicating the first setting, a reduced resolution version of the first video content;
   outputting, for display, at least a portion of the reduced resolution version of the first video content;
   determining, based on the first computing device being supplied power by an external source, a second setting associated with the first computing device;
   transmitting, by the first computing device and to the second computing device, a second request for second video content, wherein the second request comprises data indicating the second setting;
   receiving, by the first computing device and based on the data indicating the second setting, a full resolution version of the second video content; and
   outputting, for display, at least a portion of the full resolution version of the second video content.

2. The method of claim 1 further comprising:
   determining, based on data indicating that a battery is a current power supply for the first computing device, the first setting.

3. The method of claim 1 further comprising:
   determining, based on data indicating a load on a processor for the first computing device, the first setting.

4. The method of claim 1 wherein the data indicating the first setting comprises data indicating a power save mode.

5. The method of claim 1 wherein the first request is formatted according to a hypertext transfer protocol.

6. The method of claim 5 wherein the first request comprises a hypertext transfer protocol header, and wherein the hypertext transfer protocol header comprises the data indicating the first setting.

7. The method of claim 1 wherein the first request comprises a document object model associated with an application executing on the first computing device, and wherein the document object model comprises the data indicating the first setting.

8. The method of claim 1 wherein the first request comprises a cookie, and wherein the cookie comprises the data indicating the first setting.

9. The method of claim 1 wherein the reduced resolution version of the first video content is associated with a tag, wherein the tag indicates that the reduced resolution version of the first video content is for use if the data indicating the first setting indicates a power saving mode.

10. The method of claim 1 wherein the first setting indicates a screen brightness for the first computing device.

11. A method comprising:
- transmitting, by a first computing device and to a second computing device, a first request for first video content, wherein the first request comprises data indicating a setting associated with the first computing device;
- receiving, by the first computing device and based on the data indicating the setting, a reduced resolution version of the first video content;
- outputting, for display, at least a portion of the reduced resolution version of the first video content;
- transmitting, by the first computing device and to the second computing device, a second request for second video content, wherein the second request comprises data indicating that the first computing device is being supplied power by an external source;
- receiving, by the first computing device and based on the data indicating that the first computing device is being supplied power by the external source, a full resolution version of the second video content; and
- outputting, for display, at least a portion of the full resolution version of the second video content.

12. The method of claim 11 wherein the setting indicates a remaining memory capacity for the first computing device.

13. The method of claim 11 wherein the setting indicates a volume level for the first computing device.

14. The method of claim 11 wherein the setting indicates a remaining battery level for the first computing device.

15. The method of claim 11 wherein the setting indicates that a microphone for the first computing device is off.

16. The method of claim 11 wherein the setting indicates a screen brightness for the first computing device.

17. The method of claim 11 wherein the data indicating that the first computing device is being supplied power by the external source comprises data indicating that the first computing device is being supplied power via a wall outlet.

18. A method comprising:
- receiving, from a first computing device and by a second computing device, a first request for first video content, wherein the first request comprises data indicating a setting associated with the first computing device;
- retrieving, based on the data indicating the setting, a reduced resolution version of the first video content;
- transmitting, to the first computing device, at least a portion of the reduced resolution version of the first video content;
- receiving, from the first computing device, a second request for second video content, wherein the second request comprises data indicating that the first computing device is being supplied power by an external source;
- retrieving, based on the data indicating that the first computing device is being supplied power by the external source, a full resolution version of the second video content; and
- transmitting, to the first computing device, at least a portion of the full resolution version of the second video content.

19. The method of claim 18 wherein the setting indicates a remaining memory capacity for the first computing device.

20. The method of claim 18 wherein retrieving the reduced resolution version of the first video content is performed based on determining whether to retrieve, from one or more storage devices, the reduced resolution version of the first video content or a full resolution version of the first video content, and
- wherein retrieving the full resolution version of the second video content is performed based on determining whether to retrieve, from the one or more storage devices, a reduced resolution version of the second video content or the full resolution version of the second video content.

* * * * *

UNITED STATES PATENT AND TRADEMARK OFFICE
CERTIFICATE OF CORRECTION

PATENT NO. : 10,079,906 B2
APPLICATION NO. : 14/332837
DATED : September 18, 2018
INVENTOR(S) : Freiman et al.

It is certified that error appears in the above-identified patent and that said Letters Patent is hereby corrected as shown below:

On the Title Page

Page 2, Column 2, Other Publications, Line 20:
Please delete "reteieved" and insert --retrieved--

In the Specification

Column 4, Detailed Description, Line 49:
After "device", insert --.--

Column 11, Detailed Description, Line 25:
Delete "106," and insert --200,--

Signed and Sealed this
Twenty-sixth Day of February, 2019

Andrei Iancu
*Director of the United States Patent and Trademark Office*